Jan. 7, 1930.　　　　W. B. FLANDERS　　　　1,742,385

GEARING

Filed Oct. 11, 1927

WITNESS
E. Lutz

INVENTOR
W.B.Flanders
BY
a. B. Travis
ATTORNEY

Patented Jan. 7, 1930

1,742,385

UNITED STATES PATENT OFFICE

WARREN B. FLANDERS, OF PHILADELPHIA, PENNSYLVANIA, ASSIGNOR TO WESTINGHOUSE GEAR & DYNAMOMETER COMPANY, A CORPORATION OF PENNSYLVANIA

GEARING

Application filed October 11, 1927. Serial No. 225,559.

My invention relates to gearing, and especially to reduction gearing for the transmission of large powers, and it has for an object, to improve the efficiency of apparatus of this character.

Where gearing is used for the transmission of heavy powers, there is a considerable tendency for the driving member, such as a pinion, to travel around the periphery of the driven gear, and, being restrained by its bearings from accomplishing this, there results a certain torsional deflection of the pinion, which deflection produces misalignment and thus increases the wear and reduces the life of the gears.

In order to provide for such a condition and to insure proper engagement of the meshing teeth, it is necessary to maintain the distance from center to center of the meshing gears substantially constant, and, at the same time, to allow the axes of the gears to assume different positions. It is also important that there be no relative axial, or endwise sliding movement of the meshing gears during operation.

More particularly, therefore, an object of my invention is to provide gearing in which provision shall be made for maintaining proper alignment, and for preventing overtravel and endwise sliding movement of the meshing teeth.

Apparatus embodying the features of my invention is shown in the accompanying drawing, in which.

Figures 1, 3:
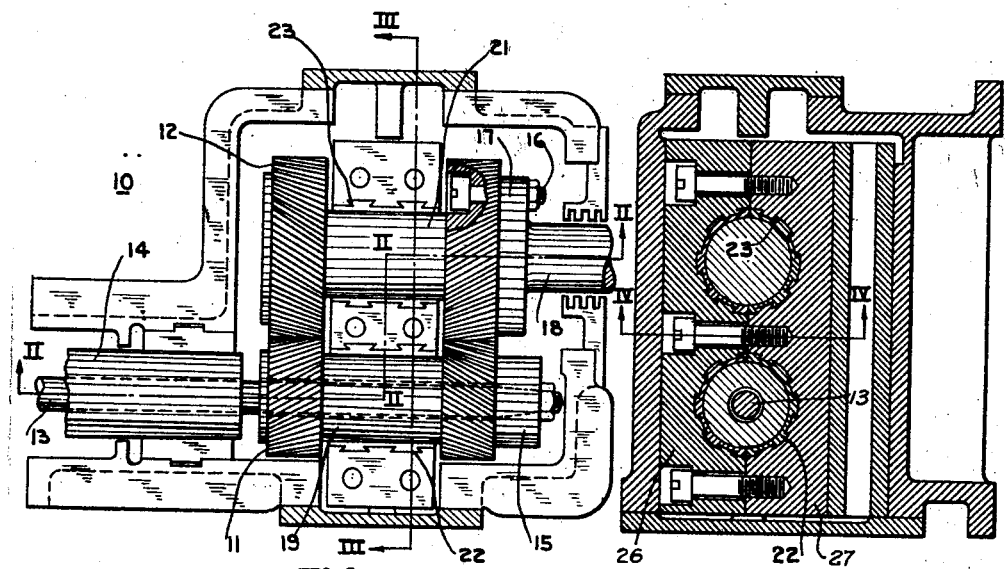
Fig. 1 is a plan view of a reduction gear with the top half of its casing removed.
Fig. 3 is a section on the line III—III of Fig. 1.
Figure 2:
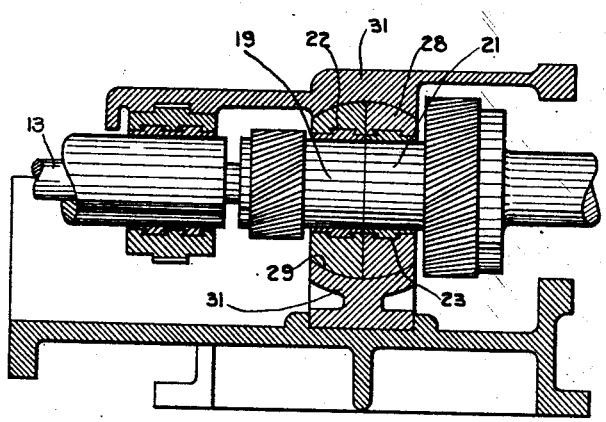
Fig. 2 is a section on the broken line II—II of Fig. 1.
Figure 4:
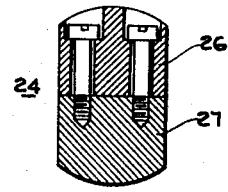
Fig. 4 is a section on the line IV—IV of Fig. 3.

According to my invention the meshing gears are supported in rigid bearings which are provided with cylindrical mountings. The rigid bearings prevent over-travel of the meshing teeth, and the cylindrical mountings of these bearings permit the axes of the gears to assume different positions without misalignment or endwise sliding movement.

While my invention is well adapted to various forms of gearing, such as transmission gearing, it is particularly well suited to reduction gearing; and, accordingly, in the drawings I have shown a reduction gear, indicated generally at 10, and comprising a pinion 11, and a gear 12, both of the latter being provided with spaced rows of oppositely inclined teeth. It will be understood, however, that inclined, or helical teeth are not essential for the practice of my invention, but that other types of teeth, such as spur teeth, may be used.

Any suitable flexible driving means may be provided for the pinion 11. I prefer to use a quill driving mechanism for this purpose, that is, the shaft 13 is supported by the bearing 14 and extends through the enlarged bore of the pinion 11 and it is connected to the pinion at the end of the latter remote from the source of power in any suitable manner, as by a coupling 15.

With this arrangement the driven gear 12 need not be hollow, but may be directly connected, as by bolts, or the like 16, to the abutting flange 17 of the driven shaft 18. By connecting the driving and the driven shafts to like ends of the pinion and of the gear respectively, it is assured torsional distortion will be more nearly equalized and that axial deflection will occur in the same direction.

The gear members 11 and 12 are provided with journal portions 19 and 21 between their respective rows of teeth. The rigid, radial bearings 22 and 23 receive the respective journal portions 19 and 21, and extend transversely through a frame structure in the form of a cylindrical mounting 24, which is formed by the supplementary, semi-cylindrical members 26 and 27, and the axes of the radial bearings are substantially parallel.

The cylindrical mounting member 24 is carried in upper and lower seats 28 and 29, respectively, in the cradle structure 31. The seats 28 and 29 are cylindrical surfaces of revolution taken about a common axis, normal to the longitudinal axes of the gear members and intersecting the latter.

The construction just described is usually utilized to transmit motion between a prime mover, such as a turbine, and a driven machine, such as a generator. The construction is especially useful in installations of this character wherein the axes of the driving and driven shaft do not fall within the same horizontal plane. In such an installation, shaft 18 will be rigidly secured to the gear 12 and the cylindrical mounting will pivot about its axis until the axes of the pinion and gear and the axis of the driven shaft are in the same plane. The misalignment referred to will then be taken care of by the flexible connection provided by the shaft 13.

In this way, it is assured that, while the axes of the gear members may assume different angular positions, they will remain substantially parallel, and hence, there can be neither over-travel, nor endwise sliding movement of the meshing teeth.

It will readily be seen, therefore, that I have provided a simple and yet rigid and efficient construction, which provides for maintaining gear members in proper relative positions, and which improves the efficiency and prolongs the life of gears, principally, by preventing over-travel and relative axial sliding movement of engaging teeth and by otherwise maintaining the gear members in proper enmeshment.

While I have shown my invention in one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. The combination with gear members having spaced rows of engaging teeth, of means between the rows of teeth of the respective members for restraining movement of the axes of the gear members to parallel planes.

2. The combination with gear members having spaced rows of meshing teeth, of bearings disposed between the rows of teeth of the respective gear members for supporting the latter, and substantially cylindrical mountings for the bearings, the axes of the mountings being transverse to the axes of the gear members.

3. The combination with gear members having spaced rows of meshing teeth, of shafts connected to like ends of the gear members, bearings disposed between the rows of teeth of the respective gear members for supporting the latter, and substantially cylindrical mountings for the bearings, the axes of the mountings being transverse to the axes of the gear members.

4. A transmission mechanism comprising a housing, provided with opposed coaxial cylindrical seat elements, a pair of meshing gears in the housing whose axes are parallel, and disposed transversely of the axis of said seat elements, and supporting means for the gears having cylindrical portions fitting said seat elements.

5. A transmission mechanism comprising a housing, provided with opposed coaxial cylindrical seat elements, a pair of meshing gears in the housing whose axes are parallel and intersect the axis of the seat elements, and supporting means having bearings for the gears and provided with cylindrical portions fitting said seat elements.

6. A transmission mechanism comprising a housing having opposed and coaxial cylindrical seat elements, a pair of meshing gear members in the housing and having parallel axes which are normal to and intersect the axis of the seat elements, each gear member consisting of a pair of gear elements connected by a journal portion, and supporting means for the gear members having bearings cooperating with the journal portions and provided with cylindrical portions fitting said seat elements.

7. In transmission mechanism, the combination of a gear unit including a plurality of meshing gears, means for supporting the gears in meshing relation and providing for tilting of the unit about a transverse axis, and driving and driven means connected to gears of the unit and one of the last-mentioned means including a flexible connection providing for tilting movement of the unit and the other of said last-mentioned means about said transverse axis.

8. In apparatus of the character described, the combination of a supporting structure, a pair of meshing gears, a frame structure provided with bearings for maintaining the gears in mesh with their axes parallel, means providing a pivotal connection between the support and the frame with the axis thereof normal to the gear axes, and driving and driven means connected to the gears and one of the last-mentioned means including a flexible connection providing for pivotal movement of the frame structure and the other of said last-mentioned means about the axis of the frame structure.

9. In apparatus of the character described, the combination of a supporting structure, a pair of meshing gears, a frame structure provided with bearings for maintaining the gears in mesh with their axes parallel, said frame structure being provided with cylindrical surfaces whose axis is normal to the gear axes, the supporting structure having cylindrical surfaces cooperating with the cylindrical surfaces of the frame structure, and shafts connected to the gears, at least one of the shafts being flexible.

In testimony whereof, I have hereunto subscribed my name this fifth day of October, 1927.

WARREN B. FLANDERS.